Oct. 10, 1961      L. J. LORENZ      3,003,573
BATTERY MOUNTING FOR TRACTORS
Filed Oct. 1, 1959      2 Sheets-Sheet 1

INVENTOR.
LEO J. LORENZ
BY Wolfe, Hubbard, Voit & Osann
ATTORNEYS.

Oct. 10, 1961  L. J. LORENZ  3,003,573
BATTERY MOUNTING FOR TRACTORS
Filed Oct. 1, 1959  2 Sheets-Sheet 2

INVENTOR.
LEO J. LORENZ
BY Wolfe, Hubbard, Voit & Osann
ATTORNEYS.

United States Patent Office 3,003,573
Patented Oct. 10, 1961

3,003,573
BATTERY MOUNTING FOR TRACTORS
Leo J. Lorenz, Farmington, Mich., assignor to Massey-Ferguson Inc., Racine, Wis., a corporation of Maryland
Filed Oct. 1, 1959, Ser. No. 843,782
1 Claim. (Cl. 180—68.5)

The invention relates to agricultural tractors generally and more particularly to an improved mounting for the storage battery commonly provided on such tractors for ignition and starting.

One object of the invention is to provide a storage battery mounting for tractors including a boxlike structure for enclosing the battery assembled with the other components of the tractor in a position which locates the battery closer to the starting motor and other accessories with which it is connected and which provides better protection for the battery.

Another object is to provide a battery mounting which makes the battery more easily accessible for service and which affords room for a larger fuel tank without increasing the over-all size of the tractor.

A further object is to provide a battery mounting which is simple and sturdy in construction and which is operative to hold the battery securely in place and yet permit it to be removed and replaced easily and quickly when required.

Other objects and advantages of the invention will become apparent from the following detailed description of the preferred embodiment illustrated in the accompanying drawings, in which FIGURE 1 is a side view of a tractor equipped with storage battery mounting structure embodying the features of the invention.

Figure 4:
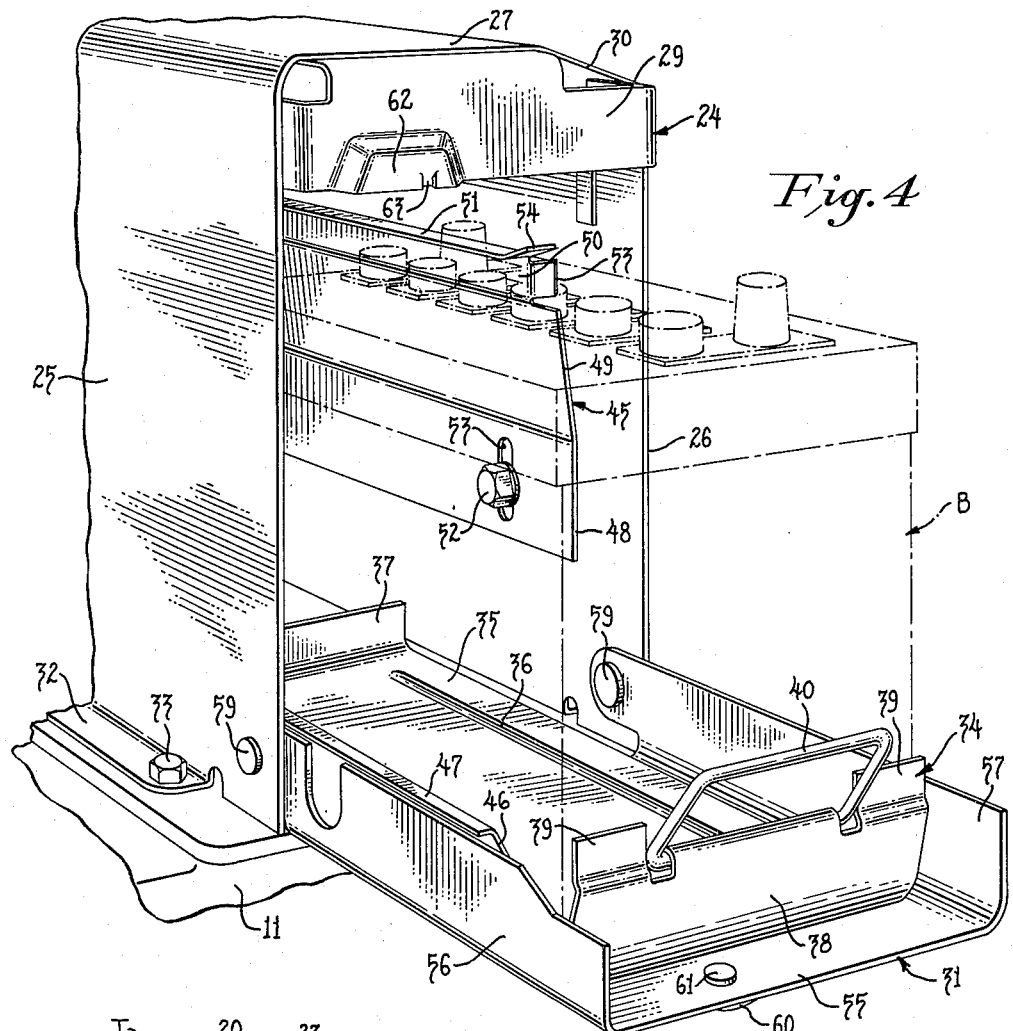
FIG. 4 is a fragmentary perspective view of the battery mounting structure as installed on the tractor.

While a preferred form of the invention has been shown and will be described in detail, this is not intended to limit the invention to details of the exemplary embodiment, the intention being to cover all modifications and adaptations falling within the spirit and scope of the invention as more broadly or generally characterized in the appended claim.

For purposes of illustration the invention has been shown as incorporated in a tractor T having an engine 10, transmission housing 11 and center housing 12 secured together in end-to-end relation to form an elongated body, the engine being at the front end of the assembly. The tractor is equipped with rear drive wheels 13 and front wheels 14 adapted to be turned for steering purposes by a steering wheel 15 carried at the upper end of a pedestal or column 16 extending upwardly from the transmission housing forwardly of the usual gear shift lever 17.

The engine 10, of course, extends upwardly a substantial distance from the top wall of the transmission housing. It is enclosed by a hood 20 having a depending radiator concealing grill 21 at its forward end and suitably hinged to the tractor body to tilt forwardly to afford access to the tractor engine. At its rear end, the hood abuts a panel 22 extending transversely across the tractor substantially centrally of the tractor body and carrying various instruments such as an ammeter, oil pressure gauge, water temperature gauge, etc. Certain additional accessories such as the fuel filter, voltage regulator, oil filter, etc., are customarily mounted on the forward portion of the panel 22 below the hood. The panel 22 as shown is supported on the pedestal 16.

As is customary in tractors of the type shown, a fuel tank 23 is supported above the engine 10. The tank is shaped to fit under the hood 20 when the latter is closed. Heretofore it has been the practice to install a storage battery B between the rear end of the fuel tank and the instrument panel 22, the battery supplying current for the engine ignition system, starter, lights, etc.

In accordance with the invention the components of the tractor have been reorganized to provide for mounting the battery B at the rear of and substantially below the top of the engine 10. This permits the fuel tank to be extended to the instrument panel and its capacity materially increased without increasing the over-all size of the tractor. Furthermore, the battery is located closer to the starting motor and other accessories to which it is to be connected so that the connecting wires can be relatively short.

Figure 1:
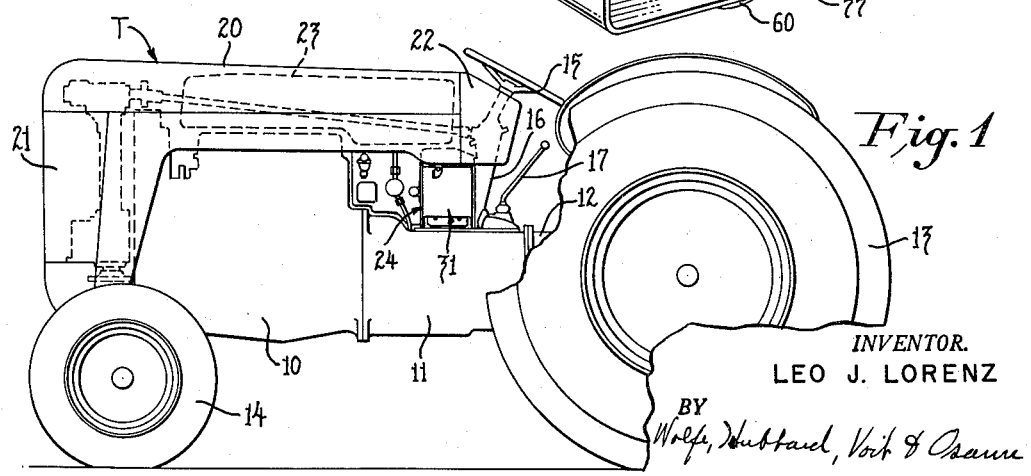
Figure 2:
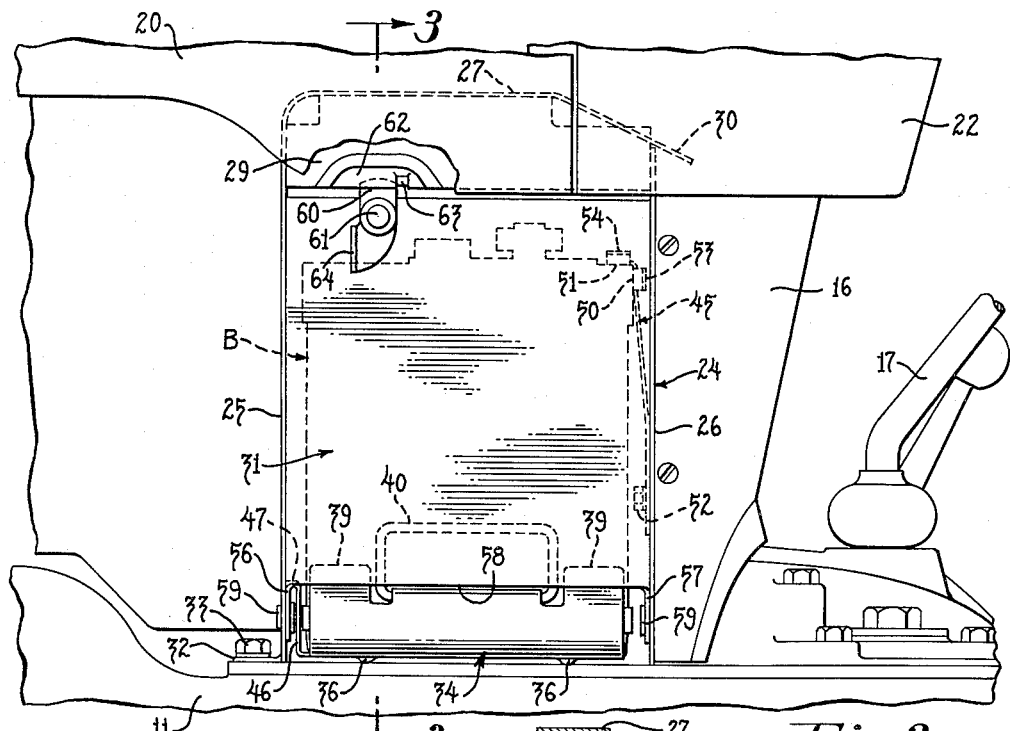
FIG. 2 is an enlarged fragmentary side view of the portion of the tractor in which the battery mounting is installed.

In carrying out the invention, a battery supporting and enclosing structure or battery box 24 is provided on the transmission housing 11 forwardly of the column 16 and at the rear of the engine 10 as shown in FIGS. 1 and 2. This structure includes a generally rectangular sheet metal shell comprising side members 25 and 26 and a top member 27. In the exemplary structure, the side and top members 25 and 27 are formed from the same metal sheet and the other side member is secured thereto by end wall members 28 and 29 welded or otherwise permanently attached thereto. The end wall member 28 is dimensioned to extend substantially the full height of the shell and to effectively close one end of the battery compartment formed by the shell. End member 29 is relatively narrow and is located adjacent the top of the shell, leaving a substantial opening below it for movement of the battery into or out of the compartment. As shown in FIGS. 2 and 4, the upper edge of the side member 26 is cut back and the adjacent corners of the end members 28 and 29 are notched to permit the marginal edge portion 30 of the top member to be bent down to afford clearance for accessories mounted on the instrument panel.

To protect the battery B and assist in holding it securely in place in the compartment, the opening in the shell is fitted with a hinged closure 31. The shell is mounted on the tractor center housing with the closure presented at one side for convenient access in installing and servicing the battery. For mounting the shell, the side wall members 25 and 26 are formed with flanges 32 extending along their lower edges adapted to rest on the top of the transmission housing and to be secured thereto as by cap screws 33.

For convenient insertion in and removal of the battery from the compartment defined by the box structure, a tray 34 is provided for supporting the battery. The tray may comprise a simple sheet metal stamping having a flat bottom 35 into which are pressed two longitudinally disposed ribs 36 forming parallel tracks on the bottom of the tray for easy sliding along the top of the housing 11. Integral upturned flanges 37 and 38 are provided at opposite ends of the bottom member 35, the front flange 38 having inwardly offset tabs 39 at its upper edge engageable with the wall of the battery to push it into the compartment with the tray. As shown, the central portion of the flange 38 between the tabs 39 is curled over to provide an anchorage for a handle 40 by which the tray and battery may be withdrawn from the compartment.

For holding the battery securely in place in the casing and preventing it from shifting when the tractor is driven over rough ground, a hold-down bracket 45 is provided on one wall of the box. Proper positioning of the battery for engagement by the hold-down bracket is insured by the provision of abutment or stop means on the tray 34 for locating the battery relative to the other wall of the box. The abutment means as herein shown comprises an integral upturned flange 46 extending along one edge of the tray bottom 35 and having its marginal edge portion 47 formed over for engagement with the box wall 25.

The hold-down bracket 45, in its preferred form, comprises a sheet metal stamping having angularly disposed marginal and intermediate portions 48 and 49. The marginal portion 48 is adapted to lie flush against the inner face of the casing wall 26 and to be secured thereto with the intermediate portion 49 inclined inwardly of the compartment or toward the battery. At its upper edge, the marginal portion 49 is shaped for engagement with the corners of the battery diagonally opposite the corner positioned by the stop flange 47. To this end the bracket is formed to present a pair of right angularly disposed flat sections or elongated strips 50 and 51, the section 50 being located in a plane parallel to the marginal portion 48 of the bracket. The two strips thus engage the side and top of the battery and, due to the resiliency of the intermediate portion of the bracket, serve to hold the battery securely in place in the tray 34.

To provide for adjustment of the bracket 45 into tight engagement with the battery, the marginal portion 48 is secured to the wall 26 as by bolts 52 received in vertically elongated slots 53 in the bracket. Once the bracket is adjusted to a particular battery, it may be left in place and the battery inserted or removed by simply sliding the tray into or out of the box. Such movements are facilitated by separating the end portions of the strips 50 and 51 adjacent the open end of the compartment to form tabs 53 and 54. As shown in FIG. 4, the tabs are bent out at a slight angle to the planes of the strips to guide the battery into operative relation to the bracket as it is initially inserted in the compartment.

In accordance with another aspect of the invention the closure 31 is constructed and related to the other elements of the box structure 24 in a novel manner which enables it to serve as a slideway and support for the tray 34 and the battery B. The closure 31 as shown is generally channel-shaped, comprising a flat sheet metal plate 55 with integral upturned flanges 56 and 57 at opposite side edges. The plate 55 is dimensioned laterally to space the flanges 56 and 57 apart for a snug fit between the side walls 25 and 26 of the box structure. It is dimensioned vertically to extend substantially to the lower edge of the end wall member 29 and thus effectively close the opening through which the battery is inserted in and withdrawn from the battery compartment formed by the box structure.

Figure 3:
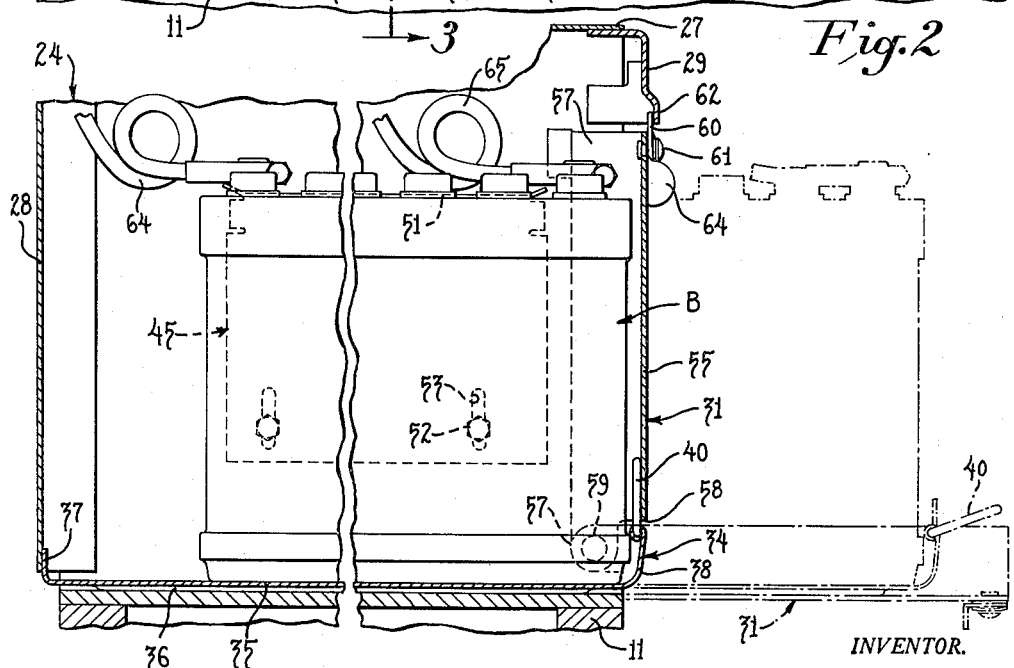
FIG. 3 is a fragmentary sectional view taken in a plane substantially on the line 3—3 of FIG. 2.

To enable the closure 31 to serve effectively as a slideway for the tray, it is hinged to the box structure so that when swung to open position, the inner face of the plate 55 will lie flush with or in the same plane as the top surface of the transmission housing 11 which forms the bottom of the battery compartment. For this purpose, the flanges 56 and 57 are extended below the lower edge 58 of the plate as shown in FIGS. 2 and 3 and the extensions are apertured for the reception of pivot pins 59 adapted to engage in registering apertures in the adjacent box structure walls. The pivot pin apertures are related to the walls of the box structure and the closure so that the edge 59 of the plate 55 abuts the side of the transmission housing with the top surface of the plate flush with the top of the housing as the closure swings into a horizontal position. The closure is thus held in the horizontal position as shown in FIG. 4 with the plate 55 and the top surface of the transmission housing defining a continuous flat slideway over which the tray 34 can be moved easily between the positions shown respectively in the full and broken lines in FIG. 3.

With the tray and battery fully inserted in the compartment, the closure 31 may be swung to the closed position and locked in that position by latch means provided for the purpose. The latch means may be of any suitable type, that shown comprising a latch element 60 pivotally mounted on the closure as by a pin 61 so that its tip portion can be swung into a boss 62 struck out of the end member 29. A lug 63 struck inwardly from the edge of the boss constitutes a stop for marking the limit position of the latch element in the locked position. For convenient manipulation the end of the latch element opposite the tip is formed with a turned up portion 64 constituting a fingerpiece by which the latch element can be swung between locking and release positions.

The battery terminals are connected to the various tractor components by cables 64 and 65 of sufficient length to accommodate the movements of the battery into and out of the box structure 24. Even so, only relatively short cables are required as the battery is located closely adjacent the starter motor and generator and other accessories to which it is electrically connected. Any slack that develops when the battery is pushed into the compartment may be taken up by looping the cables as shown in FIG. 2.

As the opening to the battery compartment is presented at the side of the tractor the battery may be reached conveniently for servicing when required. To remove the battery, it is only necessary to release the latch and swing the closure 31 down to the horizontal position. Then by grasping the handle 40, the tray 34 and with it the battery B can be withdrawn completely from the compartment. In the withdrawn position the battery is adequately supported by the closure 31 and its top portion is completely exposed for any necessary servicing operations.

Replacement of the battery is equally easy, as it may simply be set in the tray 34 in the withdrawn position and the necessary connections made with the battery terminals. Thereafter, it is only necessary to push the tray into the compartment, thus forcing the battery under the engaging strips of the hold-down bracket which anchors it securely in place. The battery is protected from the entry of dirt or other foreign material by the box structure and its location on the center housing at the rear of the engine minimizes the length of the conductors or cables required for connecting it to the associated elements of the tractor. Moreover, the relocation of the battery in the manner contemplated by the present invention makes available additional space for enlargement of the fuel tank which can now be extended substantially to the forward end of the instrument panel.

I claim as my invention:

A battery mounting for tractors comprising, in combination, a sheet metal box structure having side walls, a top wall and one end wall defining a storage battery compartment, means securing said box to the body of a tractor with the top surface of a transmission housing forming the bottom of the box, a battery supporting tray adapted to rest on said box bottom within said compartment, a closure member including a flat metal plate having flanges at opposite side edges spaced apart to fit against the side walls of the box, pins extending through said flanges and the adjacent walls pivotally connecting the member to the structure to swing about a horizontal axis, said flanges extending beyond one end of said plate to accommodate said pins and locate the pivot axis of the member so that the lower edge of the plate engages the side of the tractor body to retain the plate in the same plane as the top surface of the transmission housing when the closure member is swung to open position and thereby define a slideway on which said tray may be withdrawn from the compartment.

References Cited in the file of this patent

UNITED STATES PATENTS

| | | |
|---|---|---|
| 1,648,536 | Brumbaugh | Nov. 8, 1927 |
| 1,678,033 | Brumbaugh | July 24, 1928 |
| 2,158,784 | Dean | May 16, 1939 |
| 2,185,033 | Melcher | Dec. 26, 1939 |
| 2,360,056 | Heitshu | Oct. 10, 1944 |
| 2,548,256 | Deo | Apr. 10, 1951 |